(12) United States Patent
Pham et al.

(10) Patent No.: US 7,526,775 B2
(45) Date of Patent: Apr. 28, 2009

(54) COMPONENT INSTALLATION TOOL

(75) Inventors: Tuan Huu Pham, Great Falls, VA (US); Daniel Joseph O'Connell, Leesburg, VA (US); Evan Yu-Ling Chu, Gaithersburg, MD (US); William P. Strang, Arlington, VA (US); Son T. Luu, Oak Hill, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 1515 days.

(21) Appl. No.: 09/855,683

(22) Filed: May 16, 2001

(65) Prior Publication Data

US 2001/0044857 A1 Nov. 22, 2001

Related U.S. Application Data

(60) Provisional application No. 60/204,759, filed on May 17, 2000, provisional application No. 60/207,318, filed on May 30, 2000.

(51) Int. Cl.
*G06F 13/00* (2006.01)
(52) U.S. Cl. .................. 719/321; 709/217; 709/219; 717/176; 717/178
(58) Field of Classification Search .......... 709/321, 709/322, 327, 328, 217, 219; 719/321; 717/176, 717/178
See application file for complete search history.

(56) References Cited

U.S. PATENT DOCUMENTS

| 5,819,107 | A | * | 10/1998 | Lichtman et al. ............ 710/8 |
| 5,914,945 | A | | 6/1999 | Abu-Amara et al. |
| 5,919,247 | A | | 7/1999 | Van Hoff et al. |
| 5,951,639 | A | | 9/1999 | MacInnis |
| 5,961,608 | A | * | 10/1999 | Onosaka et al. ............ 709/249 |
| 6,009,480 | A | * | 12/1999 | Pleso ............................ 710/8 |
| 6,023,585 | A | * | 2/2000 | Perlman et al. ............ 717/178 |
| 6,029,196 | A | | 2/2000 | Lenz |
| 6,064,982 | A | | 5/2000 | Puri |
| 6,075,863 | A | * | 6/2000 | Krishnan et al. ............ 713/191 |
| 6,091,508 | A | * | 7/2000 | Love et al. ............... 358/1.15 |
| 6,311,165 | B1 | * | 10/2001 | Coutts et al. ............... 705/21 |

(Continued)

FOREIGN PATENT DOCUMENTS

EP 0 767 564 4/1997

(Continued)

OTHER PUBLICATIONS

Japanese Patent Office Action for corresponding Japanese Patent Application 2001-585477 dated Dec. 15, 2005.

(Continued)

*Primary Examiner*—Andy Ho
(74) *Attorney, Agent, or Firm*—Fish & Richardson P.C.

(57) ABSTRACT

Installing computer software components on a client device for enabling connectivity to a host system by at least one of several different hardware devices typically includes receiving a connectivity component for enabling connectivity to a host system by at least one of several different hardware devices and detecting whether installation of the connectivity component is needed to enable connectivity between the client device and the host system. The connectivity component is typically installed on the client device when installation of the connectivity component is needed.

51 Claims, 9 Drawing Sheets

U.S. PATENT DOCUMENTS

| | | | |
|---|---|---|---|
| 6,360,364 B1 * | 3/2002 | Chen et al. | 711/169 |
| 6,418,555 B2 * | 7/2002 | Mohammed | 710/8 |
| 6,453,468 B1 * | 9/2002 | D'Souza | 717/168 |
| 6,473,854 B1 * | 10/2002 | Fleming, III | 713/1 |
| 6,694,354 B1 * | 2/2004 | Elg | 709/217 |
| 6,745,237 B1 | 6/2004 | Garrity et al. | |
| 2001/0010059 A1 | 7/2001 | Burman et al. | |

FOREIGN PATENT DOCUMENTS

| | | |
|---|---|---|
| EP | 0 793 170 | 9/1997 |
| JP | 10-336237 | 12/1998 |
| JP | 11-341488 | 12/1999 |
| WO | WO 95/25311 | 9/1995 |
| WO | WO 99/63713 | 12/1999 |

OTHER PUBLICATIONS

Office Action for U.S. Appl. No. 09/852,744, dated Dec. 30, 2005.

International Search Report (International Application No. PCT/US01/40721), Feb. 19, 2002.

International Search Report (International Application No. PCT/US01/40740) May 21, 2002.

* cited by examiner

COMPONENT INSTALLATION TOOL

CROSS REFERENCE TO RELATED APPLICATIONS

This application claims priority from U.S. Provisional Application No. 60/204,759, filed May 17, 2000, and titled "Component Installation Tool," and from U.S. Provisional Application No. 60/207,318, filed May 30, 2000, and titled "Automatic Detection of Communication Speed," both of which are incorporated by reference.

TECHNICAL FIELD

This invention relates to the installation of modular software components, and more particularly to the modular installation of connectivity components.

BACKGROUND

The need and the ability of conventional systems, methods, and computer programs to update core software programs easily with different software components have become increasingly important for a variety of reasons. For instance, there are an increasing number of new and upgraded connection types available to consumers for use with core software programs. For the consumer, these new and upgraded connection types may enhance connectivity between their computer and a host system. For instance, a new or upgraded connection type may involve use of a new or upgraded hardware communication device, such as an upgrade from a low-bandwidth connection type (e.g., an analog dial-up modem) to a broadband connection type (e.g., a cable modem). Yet, consumers who are not skilled enough to manually upgrade core software programs to communicate with new or upgraded connection types may not be able to take advantage of the existence of the new or upgraded connection device.

SUMMARY

In one general aspect, installing computer software components on a client device for enabling connectivity to a host system by at least one of several different hardware devices typically includes receiving a connectivity component for enabling connectivity to a host system by at least one of several different hardware devices and detecting whether installation of the connectivity component is needed to enable connectivity between the client device and the host system. The connectivity component is typically installed on the client device when installation of the connectivity component is needed.

Implementations may include one or more of the following features. For example, one or more connectivity components may be received from a local and/or a remote source. A local source may include a storage device and/or a CD-Rom located on the client device. A remote source may include a remote server. When multiple connectivity components are received, a determination may be made as to whether installation of at least one of the connectivity components is needed to enable connectivity between the client device and the host system.

A connectivity component may be capable of interfacing a device driver to enable communications between computer software at the client device and the host system using a hardware device associated with the device driver. Additionally or alternatively, a connectivity component may be capable of interfacing directly with the selected hardware device to enable connectivity between the client device and the host system using the selected hardware device.

A received connectivity component may include computer software that interfaces with a driver associated with a hardware device that is used to connect to the host system. A connectivity component may include a broadband connectivity component to enable connectivity to the host system using a broadband connectivity device. For example, a connectivity component may include a DSL connectivity component to enable connectivity to the host system using a DSL modem, a cable connectivity component to enable connectivity to the host system using a cable modem, or a satellite connectivity component to enable connectivity to the host system using a satellite modem.

Detecting whether installation of the connectivity component is needed may be in response to an input received from a user of the client device requesting communications using the selected hardware device. The connectivity component is typically installed when the connectivity component is needed based on the input from the user of the client device. The input from the user of the client device may include a request to change connectivity to the host system from a low-bandwidth connection type to a broadband connection type.

Installing the connectivity component may include installing a list of programs needed to install the connectivity component. The list of programs may include a sequential list of programs needed to install the connectivity component such that only one reboot of the client device is necessary to accomplish installation using the sequential list of programs.

Detecting whether installation of a connectivity component is needed to enable connectivity to a host system may further include automatically detecting a hardware device and determining the connectivity component needed to enable connectivity to the host system associated with the detected hardware device. Detecting whether installation of the connectivity component is needed on the client device also may include searching at least one storage medium on the computer for the connectivity component when the detection module detects that the installation of the connectivity component is needed.

The presence of the connectivity component at the client device may be detected and the connectivity component may be received from a remote server for installation on the client device when the connectivity component is not detected on the client device.

At least one connectivity component may be copied to the client device from a disk and stored in a dormant state on the client device. The connectivity component stored on the client device in the dormant state may be installed on the client device. A connectivity component may be received, a determination may be made as to whether the connectivity component is needed on the client device, and the connectivity component may be installed on the client device when necessary. All of the steps from reception to installation may be performed automatically and without user intervention.

Receiving a connectivity component may include receiving an updated version of a connectivity component stored on the client device before the connectivity component has been installed. A determination may be made as to whether installation of the connectivity component is necessary by comparing a version of the updated connectivity component received with a version of the connectivity component stored on the client device.

In one implementation, version information associated with a connectivity component may be received from a remote server. To determine whether installation of the connectivity component is needed on the client device, the version information received from the remote server may be compared with version information associated with the connectivity component already received. If the version information associated with the stored connectivity component is correct when compared against the version information received from the remote server, then the stored connectivity component is installed. Otherwise, if the version information is not correct, an updated connectivity component is generally received from the remote server and installed on the client device.

In another implementation, a new hardware device on the client device may be detected and, based on detecting the new hardware device, a determination may be made as to whether a connectivity component has been received that is needed to enable connectivity between the client device and the host system using the new hardware device. If the connectivity component has been received, then the connectivity component typically is installed. Otherwise, if the connectivity component has not been received, then an updated connectivity component may be received from the remote server and installed on the client device.

In another implementation, the host system may receive a request to send a connectivity component to a local client device. In response to the request to send the connectivity component, the host system typically sends the connectivity component to the local client device for installation. Additionally, the host system may determine a version of the connectivity program that needs to be installed on the local client device.

It is important for core software programs to enable seamless changes to accommodate different connection types, and thus, different connectivity components, for different hardware configurations.

These general and specific aspects may be implemented using a system, a method, or a computer program, or any combination of systems, methods, and computer programs.

Other features and advantages will be apparent from the description and drawings, and from the claims.

DESCRIPTION OF DRAWINGS

FIG. 6b is a block diagram of modules that may be included in the component installation tool of FIG. 6a.

Like reference symbols in the various drawings indicate like elements.

DETAILED DESCRIPTION

For illustrative purposes, FIGS. 1-5 shows an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Figure 1:
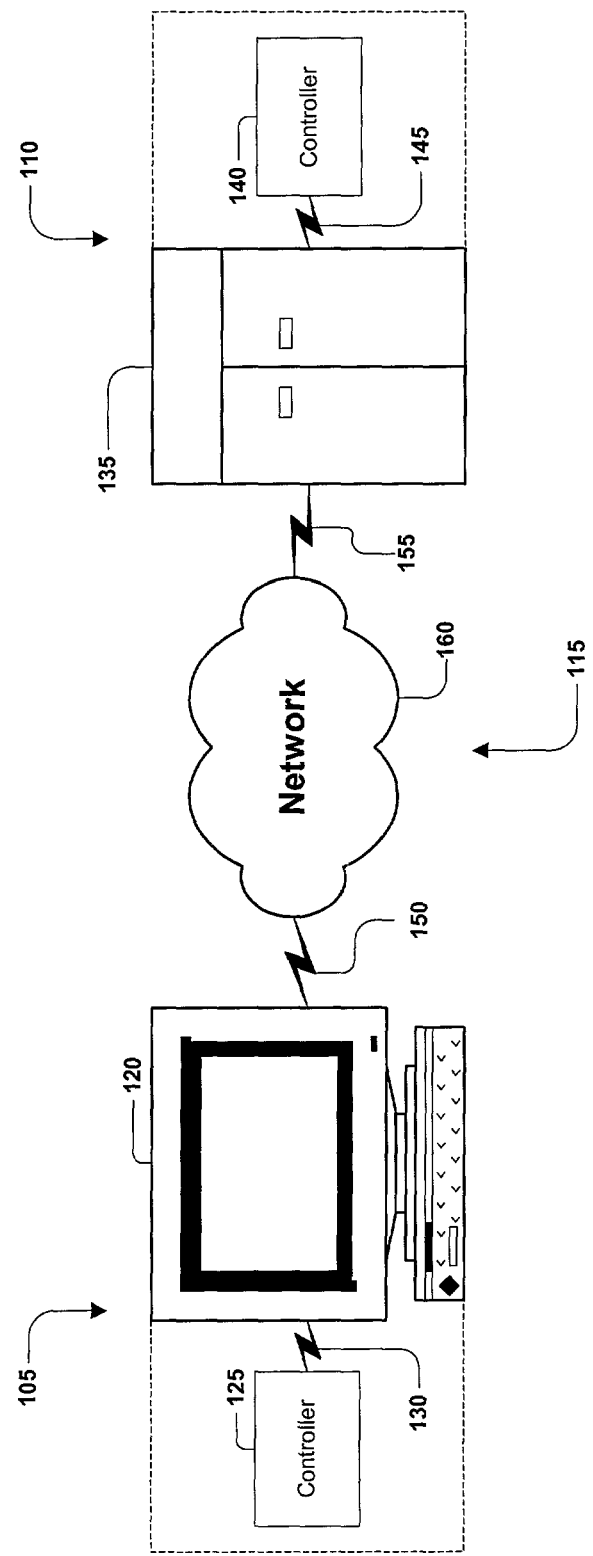
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The client device 120 and the host device 135 may include devices that are capable of peer-to-peer communications.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 2:
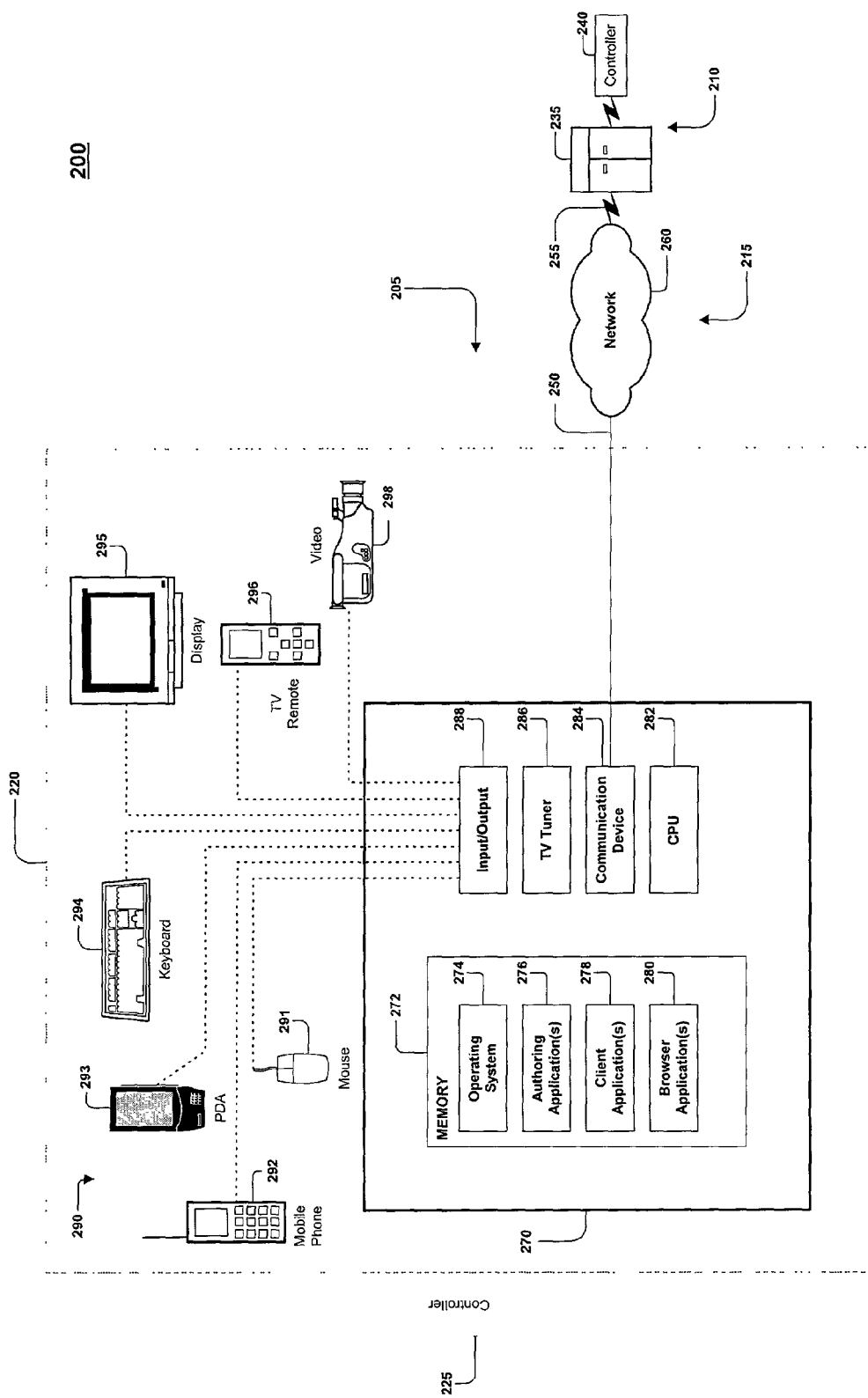
FIGS. 2-5 are block diagrams of expansions of aspects of the communications system of FIG. 1.

FIG. 2 illustrates a communications system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communications system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible implementation of the client system 105 of FIG. 1.

The client device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), an MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, an MP3 player (not shown), and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
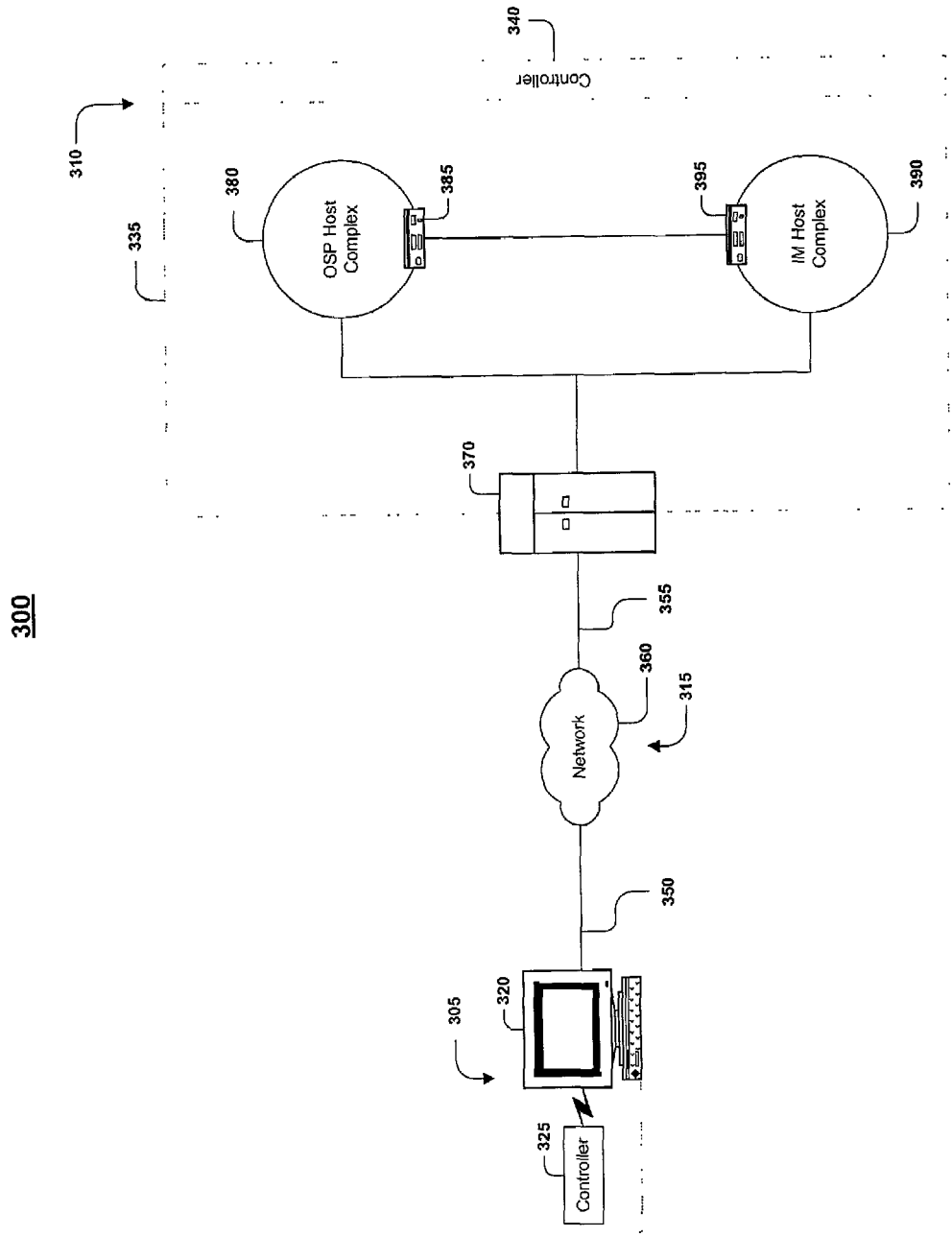

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communications system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible implementation of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. In other implementations, as described above, the host controller 340 may include any of several other programs, machines, and devices operating independently or collectively to control the host device 335.

The host device 335 includes a login server 370 for enabling access by subscribers and for routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
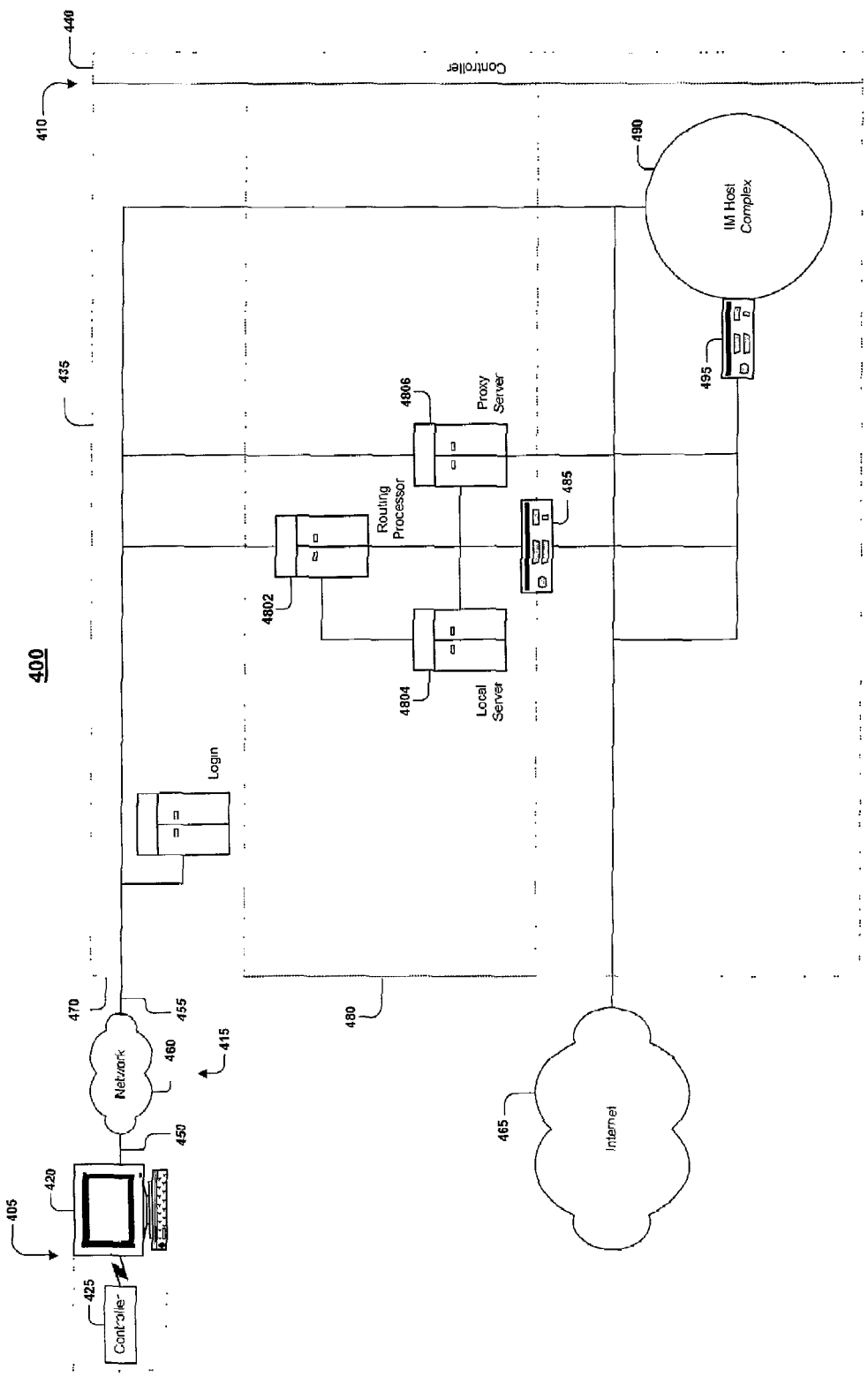

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communications system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible implementation of the host systems 110, 210, and 310 shown in FIGS. 1-3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communications between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In one implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet 465 in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber may use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include an L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
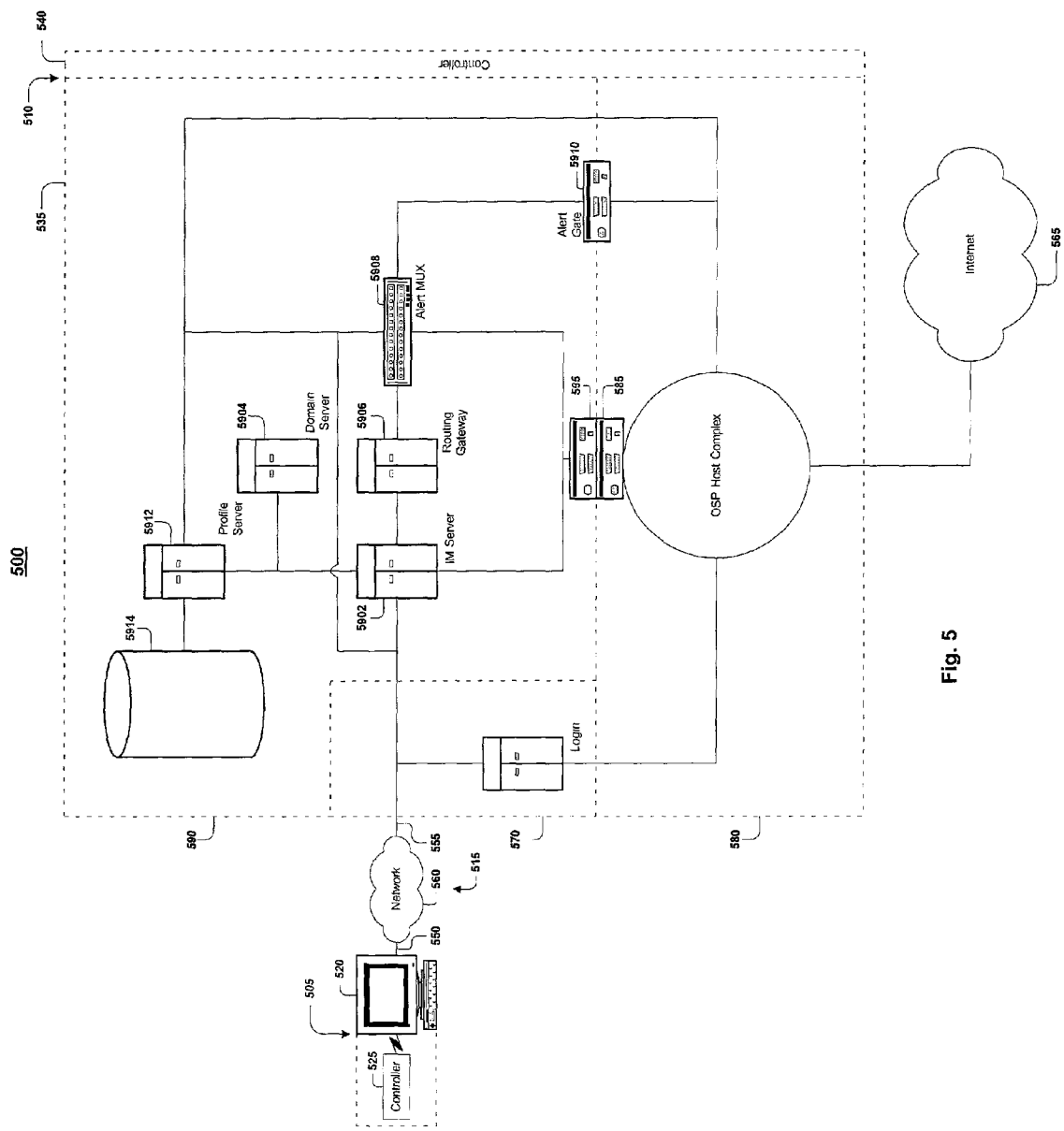

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communications system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible implementation of the host systems 110, 210, 310, and 410 shown in FIGS. 1-4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the World Wide Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM host complex gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 580 to share subscriber profile data with other services. Alternatively, user profile data may be saved locally on the client device 520.

Figure 6A:
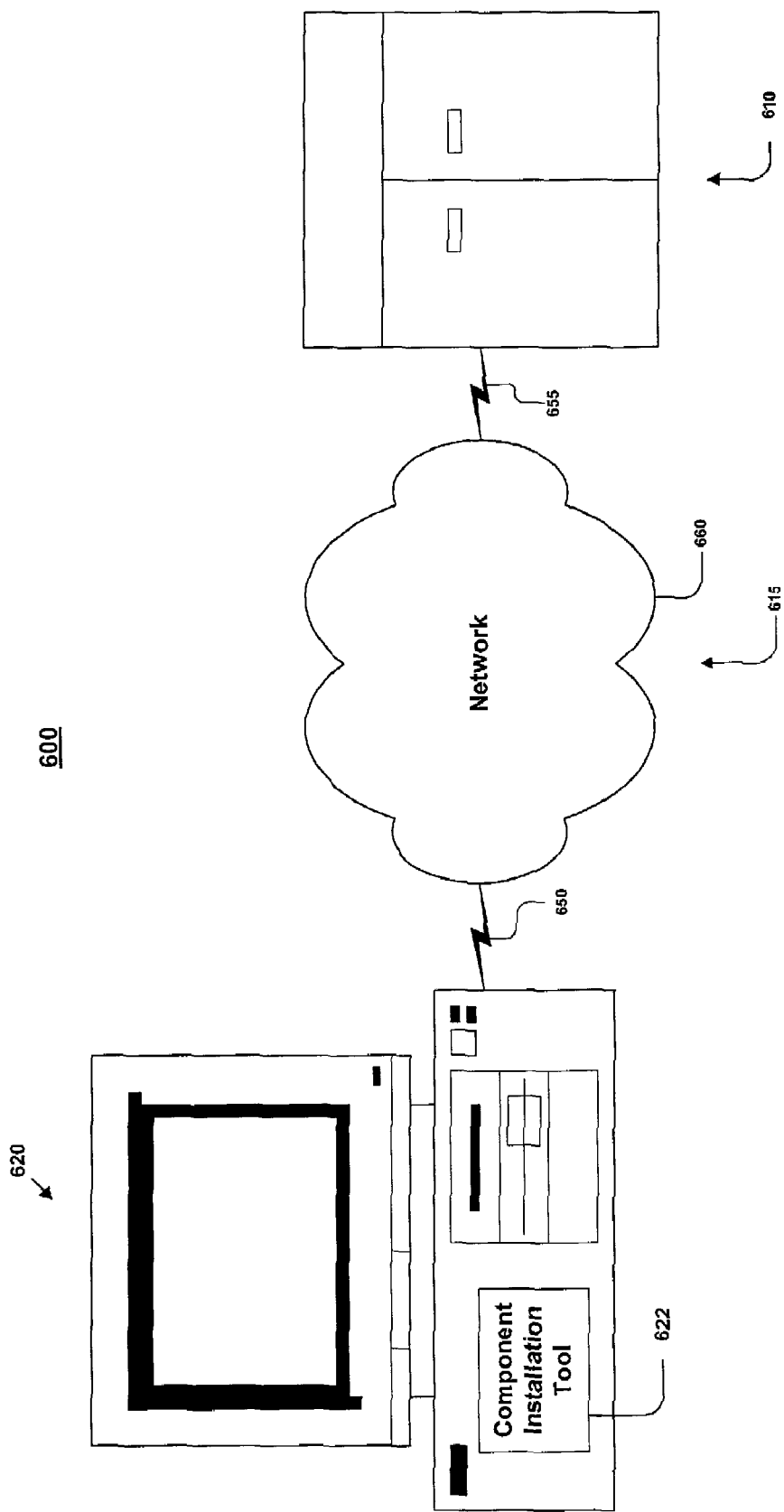
FIG. 6a is a block diagram of a communications system including a system for installing computer software components.

FIG. 6a shows a block diagram of a communication system 600 including a client device 620 having a component installation tool 622, a host system 610, and a communications link 615 enabling communications between the client device 620 and the host system 610. Client device 620 typically corresponds to client devices 120, 220, 320, 420, and 520, and communications link 615 typically corresponds to communications links 115, 215, 315, 415, and 515, as described above with respect to FIGS. 1-5. Host system 610 typically corresponds to host systems 110, 210, 310, 410, and 510 as described above with respect to FIGS. 1-5. The communications link 615 may include communication pathways 650, 655 enabling communications through one or more delivery networks 660.

Component installation tool 622 typically is included as part of client device 620. The component installation tool 622 may include one or more software components, one or more hardware components, or any combination of these components capable of being programmed to function in the manner described below. The component installation tool 622 typically includes a component installation mechanism that may be used to receive, detect, and/or install any type of software component on a computer. More particularly, the component installation tool 622 may be used to receive, detect, and/or install connectivity components on a client device 620 to enable connectivity to a host system 610 using different hardware devices.

In one exemplary implementation, a software component may include a connectivity component that typically includes the software necessary to enable communications between the client device 620 and the host system 610 using a particular hardware communication device. For instance, the connectivity component may further include computer software that interfaces with a driver for a hardware device and/or may interface directly with the hardware device that is used to connect to the host system. In one example, a connectivity component may include a broadband connectivity component that enables connectivity between the client device 620 and the host system 610 using a broadband communication hardware device. The broadband connectivity component may include a DSL connectivity component to enable connectivity to the host system using a DSL modem, a cable connectivity component to enable connectivity to the host system using a cable modem, a satellite connectivity component to enable connectivity to the host system using a satellite modem, or another connectivity component useful for enabling communications for some other broadband communication hardware device.

In another example, a connectivity component may include a low-bandwidth connectivity component that enables connectivity between the client device 620 and the host system 610 using a low-bandwidth communication hardware device. For instance, a low-bandwidth connectivity component may include a dial-up connectivity component to enable connectivity to the host system using a dial-up modem, a cellular connectivity component to enable connectivity to the host system using a cellular and/or wireless device, or another connectivity component useful for enabling communications for some other low-bandwidth communication hardware device.

A connectivity component may include information about itself, such as a type of connectivity component, a version indicator, an operating system indicator, a microprocessor indicator, and other types of identifying information.

Figure 6B:
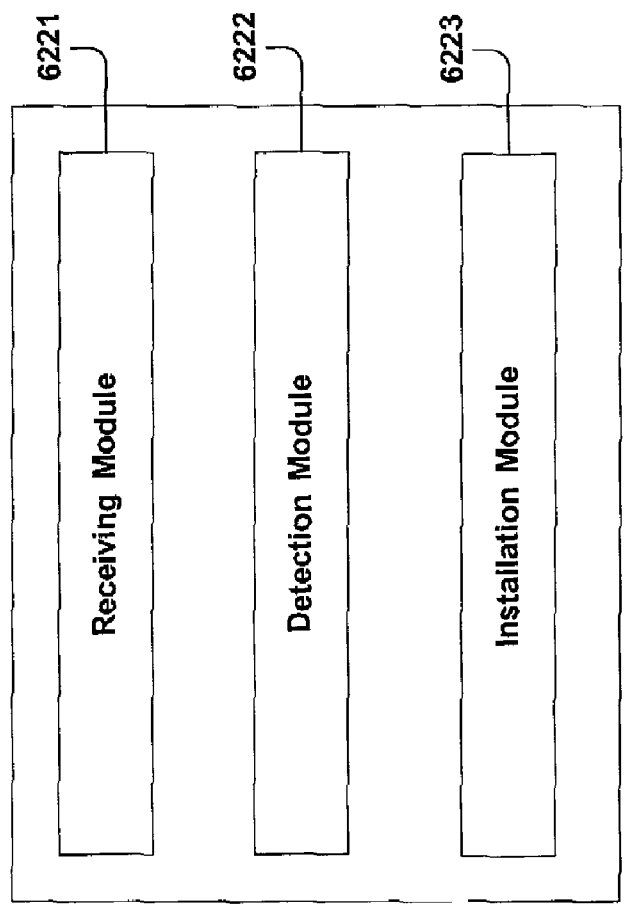

Referring to FIG. 6b, component installation tool 622 may include a receiving module 6221, a detection module 6222, and an installation module 6223. The receiving module 6221 typically is structured and arranged to receive a software component, such as, for example, the connectivity component that enables connectivity to the host system 610 by at least one of several different hardware devices. The detection module 6222 typically is structured and arranged to detect whether installation of the software component, such as, for example, the connectivity component, is needed on the client device 620 to enable connectivity between the client device

620 and the host system 610 using the selected hardware device. The installation module 6223 typically is structured and arranged to install the software component, such as, for example, the connectivity component, when the connectivity component is needed on the client device 620 to enable connectivity between the client device 620 and the host system 610 using the selected hardware device.

More particularly, in one exemplary implementation, the receiving module 6221 may receive one or multiple connectivity components from a local source and/or a remote source. For instance, the receiving module 6221 may receive the connectivity component from a local storage device, such as a hard disk and/or an external disk (e.g., a CD-Rom), located on the client device 620. In addition or as an alternative, the receiving module 6221 may receive one or multiple connectivity components from a remote source external to the client device 620. Examples of remote sources include a remote server located within the host system 610. In one example, the receiving module 6221 may receive the connectivity component from a remote server for installation on the client device 620 when the detection module 6222 does not detect the connectivity component on the client device 620.

A connectivity component may be transferred from a remote source to a local source and/or a local source to a local source. For example, the receiving module 6221 may receive one or more connectivity components from the local source, which may be a CD-Rom that includes the connectivity components and is inserted into the client device 620. The connectivity components may be copied from the CD-Rom onto a storage area of the client device 620. When the connectivity components are copied from the CD-Rom to the client device 620, they may remain in a dormant state until they are activated and installed, as needed, on the client device 620. Additionally or alternatively, one or more connectivity components may be transferred from a remote server to a local source on the client device 620.

When the receiving module 6221 receives multiple connectivity components from the local and/or remote source, the detection module 6222 may detect whether installation of at least one of the received connectivity components is needed to enable connectivity between the client device 620 and the host system 610 using the selected hardware device. For example, the receiving module 6221 may receive a DSL connectivity component, a cable connectivity component, and a satellite connectivity component from the local and/or remote source. The user of the client device 620 may want the client device to communicate with the host system using a cable modem. In this case, the detection module 6222 typically determines whether a cable connectivity component is installed on the client device 620, and, if one is not installed, selects the cable connectivity component that was received to be installed on the client device. The detection module 6222 may search at least one storage medium on the client device 620 for the needed connectivity component.

In one implementation, the detection module 6222 may detect whether the installation of the connectivity component is needed to enable connectivity between the client device 620 and the host system 610 in response to an input received from a user of the client device 620 requesting communications using the selected hardware device. When installation is determined to be needed, the installation module 6223 would install the connectivity component. For example, the input from the user of the computer may include a request to change connectivity to the host system from a low-bandwidth connection type to a broadband connection type. The detection module 6222 may detect whether the connectivity component needed for the broadband connection type is installed on the client device 620. If the connectivity component is not installed, then the detection module 6222 may search a local storage device for the connectivity component. If the connectivity component is present on the local storage device, then the installation module 6223 will install the stored connectivity component. If the connectivity component is not stored on the local storage device, then the detection module 6222 may search a disk (e.g., a CD-Rom) that the client device 620 is capable of reading for the connectivity component. If the connectivity component is present on the disk, then the installation module 6223 will install that connectivity component.

If the connectivity component is not stored on the local storage device and/or the disk, then the receiving module 6221 may download the connectivity component from a remote server, and the installation module 6223 will install the downloaded connectivity component. For instance, when the connectivity component needs to be downloaded from the remote server, the remote server may receive a request for the connectivity component from the client device 620. In response to the request for the connectivity component, the remote server typically sends the connectivity component to the client device 620 for installation on the client device 620.

In another implementation, the receiving module 6221, the detection module 6222, and the installation module 6223 may receive, detect, and install the connectivity component automatically, without user intervention, to enable connectivity to the host system 610 using a selected hardware device. For instance, the detection module 6222 may include an automatic hardware device detector that is structured and arranged to automatically detect a hardware device and determine whether the connectivity component is needed to enable connectivity to the host system associated with the hardware device detected.

In another implementation, the detection module 6222 may be designed to detect new hardware devices and, when a new device is detected, determine whether a connectivity component that is needed to enable connectivity between the client device 620 and the host system 610 using the new hardware device has been received. The installation module 6223 installs the connectivity component when the detection module 6222 determines that the connectivity component has been received. By contrast, when the detection module 6222 determines that the connectivity component has not been received, the receiving module 6221 receives an updated connectivity component from a remote server and the installation module 6223 installs the updated connectivity component.

In one implementation, the detection module 6222 may detect whether the connectivity component requires installation on the client device 620 by detecting a version of the received connectivity component, comparing that version against a correct version of the connectivity component, and determining whether the connectivity component needs to be installed based on the version detected. If the version matches, or if the version is sufficiently close to the correct version, then the installation module 6223 installs the connectivity component. Otherwise, if the version does not match, or if the version is not sufficiently close to the correct version, then the installation module 6223 does not install the connectivity component and the receiving module 6221 may receive an updated connectivity component for installation by the installation module 6223. In this implementation, the connectivity component received may include an updated version of a connectivity component stored on the client device 620 before the updated connectivity component is installed by the installation module 6223.

In another implementation including the use of version and/or other information to determine whether an install is appropriate, the detection module 6222 may detect whether the connectivity component requires installation on the client device 620. In order to determine when installation of the connectivity component is needed, the detection module 6222 may determine a version of the connectivity component to install by comparing version information received from a remote server with version information associated with the connectivity component already received by the receiving module 6221. The installation module 6223 then may install the connectivity component stored on the client device 620 when the detection module 6222 determines that the version information associated with the stored connectivity module is correct when compared against the version information received from the remote server. If the version information is not correct, then the receiving module 6221 may receive an updated connectivity component from the remote server, and the installation module 6223 may install the updated connectivity component received from the remote server. In this implementation, the receiving module 6221 may receive version information from a remote server, where the version information is associated with a connectivity component.

Additionally or alternatively, the client device 620 may send a request to the remote server for information that indicates the particular connectivity component is appropriate for installation on the client device 620. For example, the client device 620 may send an identifier to the remote server. The identifier may include information such as, for example, operating platform type, microprocessor type, and client application type. The remote server, which includes a database of records corresponding to identifiers and connectivity components, typically uses the identifier to search the database of records to find the appropriate record that satisfies the client device's request. The remote server sends the appropriate record to the client device that indicates which particular connectivity component is appropriate for installation. The client device 620 uses the record information to determine whether installation of the particular connectivity is necessary, and if an installation is necessary, to detect if the connectivity component is resident on the client device 620 or if the connectivity component needs to be downloaded from the remote server.

When installing a connectivity component, the installation module 6223 may be structured and arranged to install a list of programs needed to install a connectivity component. The list of programs may be sequential such that only one reboot of the client device may be necessary to accomplish installation of the sequential list of programs.

Figure 7:
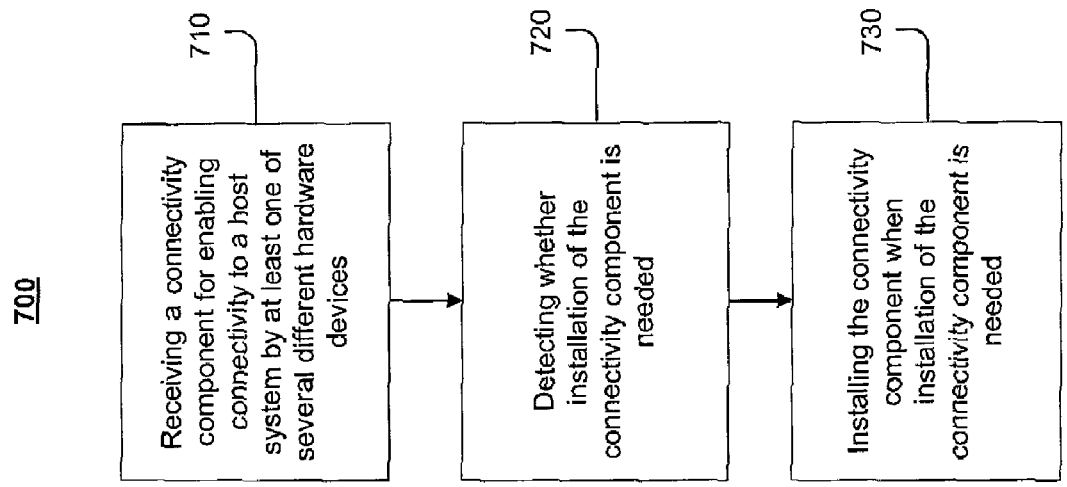
FIG. 7 is a flow chart of a process for installing computer software components.

FIG. 7 describes a process 700 for installing a computer software component, such as a connectivity component, on a client device to enable connectivity to a host system by at least one of several different hardware devices. Process 700 typically includes receiving a connectivity component for enabling connectivity to a host system by at least one of several different hardware devices (step 710), detecting whether the installation of the connectivity component is needed to enable connectivity between the client device and the host system using at least one of several different hardware devices (step 720), and installing the connectivity component when the connectivity component is needed to enable connectivity between the client device and the host system using the selected hardware device (step 730).

Process 700 may occur automatically such that the process 700 is transparent to a user of a client device. For instance, the process may occur automatically when a user boots up the client device and the client device automatically detects a new hardware device, such as a new connectivity hardware component. Additionally or alternatively, process 700 may be performed upon initiation of a user action and may be perceivable to a user after being initiated automatically, or may be initiated in response to a user interaction and remain transparent thereafter. For example, a user action may include a request to change connectivity to the host system from a low-bandwidth connection type to a broadband connection type.

Receiving the connectivity component (step 710) may include receiving one or multiple connectivity components from a local source and/or a remote source. For instance receiving the connectivity component (step 710) may include receiving the connectivity component from a local storage device located on the client device, such as a hard disk and/or an external disk (e.g., a CD-Rom). In addition or as an alternative, receiving the connectivity component (step 710) may include receiving one or multiple connectivity components from a remote source that may be external to the client device, for instance, a remote server, which may be located within the host system. In one example, receiving the connectivity component (step 710) may include receiving the connectivity component from a remote server and installing the connectivity component (step 730) on the client device when connectivity component is not detected (step 720) on the client device.

Receiving the connectivity component (step 710) may include transferring the connectivity component from a remote source to a local source and/or a local source to a local source. For example, receiving the connectivity component (step 710) may include receiving one or more connectivity components from the local source such as a CD-Rom. A CD-Rom which includes the connectivity components may be inserted into the client device. The connectivity components may be copied from the CD-Rom onto a storage area of the client device. When the connectivity components are copied from the CD-Rom to the client device, they may remain in a dormant state until they are activated and installed (step 730), as needed, on the client device. Additionally or alternatively, one or more connectivity components may be received (step 710 by transferring the connectivity components from a remote server to a local source on the client device.

When multiple connectivity components are received from the local and/or remote source (step 710), detecting whether the connectivity component needs installation (step 720) may include detecting whether installation of at least one of the received connectivity components is needed to enable connectivity between the client device and the host system using the selected hardware device. For example, a DSL connectivity component, a cable connectivity component, and a satellite connectivity component may be received from the local and/or remote source (step 710). The user of the client device may want the client device to communicate with the host system using a cable modem. In this case, detecting whether the connectivity component needs installation (step 720) includes detecting whether a cable connectivity component is installed on the client device, and, if one is not installed, selecting the cable connectivity component that was received to be installed on the client device. Detecting (step 720) may include searching at least one storage medium on the client device for the needed connectivity component.

In one implementation, detecting whether the installation of the connectivity component is needed to enable connectivity between the client device 620 and the host system (step 720) may be in response to an input received from a user of the computer requesting communications using the selected hardware device. When it is determined to be needed (step 720), installing the connectivity component occurs (step 730). For example, the input from the user of the computer may include a request to change connectivity to the host system from a low-bandwidth connection type to a broadband connection type. Detecting (step 720) may include detecting whether the connectivity component needed for the broadband connection type is installed on the client device. If the connectivity component is not installed, then detecting (step 720) may further include searching a local storage device for the connectivity component. If the connectivity component is present on the local storage device, then installation (step 730) includes installing the stored connectivity component. If the connectivity component is not stored on the local device, then detecting (step 720) may include searching a disk (e.g., a CD-Rom) for the connectivity component. If the connectivity component is present on the disk, then installation (step 730) includes installing that connectivity component.

If the connectivity component is not stored on the local storage device and/or the disk, then receiving (step 710) may include downloading the connectivity component from a remote server, and then installing the downloaded connectivity component (step 730). For instance, when the connectivity component needs to be downloaded from the remote server, the remote server may receive a request for the connectivity component from the client device. In response to the request for the connectivity component, the remote server typically sends the connectivity component to the client device for installation on the client device.

In another implementation, receiving (step 710), detecting (step 720), and installing (step 730) may be done automatically, without user intervention, to enable connectivity to the host system using a selected hardware device. For instance, detecting (step 710) may include automatically detecting a hardware device and determining whether the connectivity component is needed to enable connectivity to the host system associated with the detected hardware device.

In another implementation, detection (step 720) may include detecting new hardware devices and, when a new device is detected, determining whether a connectivity component that has been received (step 710) may be installed to enable connectivity between the client device and the host system using the new hardware device. The connectivity component may be installed (step 730) when it has been determined that the connectivity component has been received (step 720). By contrast, when it has been determined that the connectivity component has not been received (step 720), an updated connectivity component may be received from a remote server and the updated connectivity component may be installed (step 730).

In one implementation, detecting (step 720) may include detecting whether the connectivity component requires installation on the client device by detecting a version of the received connectivity component, comparing that version against a correct version of the connectivity component, and determining whether the connectivity component needs to be installed based on the version detected. If the version matches, or if the version is sufficiently close to the correct version, then the connectivity component may be installed (step 730). Otherwise, if the version does not match, or if the version is not sufficiently close to the correct version, then the connectivity component may not be installed and an updated connectivity component may be received (step 710) for installation (step 730). In this implementation, receiving the connectivity component (step 710) may include receiving an updated version of a connectivity component stored on the client device before the updated connectivity component has been installed (step 730).

In another implementation including the use of version information to determine whether an install is appropriate, detecting (step 720) may include detecting whether the connectivity component requires installation on the client device. When installation of the connectivity component is needed, detecting (step 720) may further include determining a version of the connectivity component to install by comparing the version information received from a remote server with version information associated with the connectivity component already received (step 710). Installing (step 730) may include installing the connectivity component stored on the client device once it has been determined (step 720) that the version information associated with the stored connectivity module is correct when compared against the version information received from the remote server. If the version information is not correct, receiving (step 710) may include receiving an updated connectivity component from the remote server. Then, the updated connectivity component received from the remote server may be installed (step 730). In this implementation, receiving the connectivity component (step 710) may include receiving version information from a remote server, where the version information is associated with a connectivity component.

Additionally or alternatively, the client device may send a request to the remote server for information that indicates the particular connectivity component is appropriate for installation on the client device. For example, the client device may send an identifier to the remote server. The identifier may include information such as, for example, operating platform type, microprocessor type, and client application type. The remote server, which includes a database of records corresponding to identifiers and connectivity components, typically uses the identifier to search the database of records to find the appropriate record that satisfies the client device's request. The remote server sends the appropriate record to the client device that indicates which particular connectivity component is appropriate for installation. The client device uses the record information to determine whether installation of the particular connectivity is necessary, and if an installation is necessary, to detect if the connectivity component is resident on the client device or if the connectivity component needs to be downloaded from the remote server.

When a connectivity component is installed, installing (step 730) may include installing a list of programs needed to install a connectivity component. The list of programs may be sequential such that only one reboot of the client device may be necessary to accomplish installation of the sequential list of programs.

Figure 8:
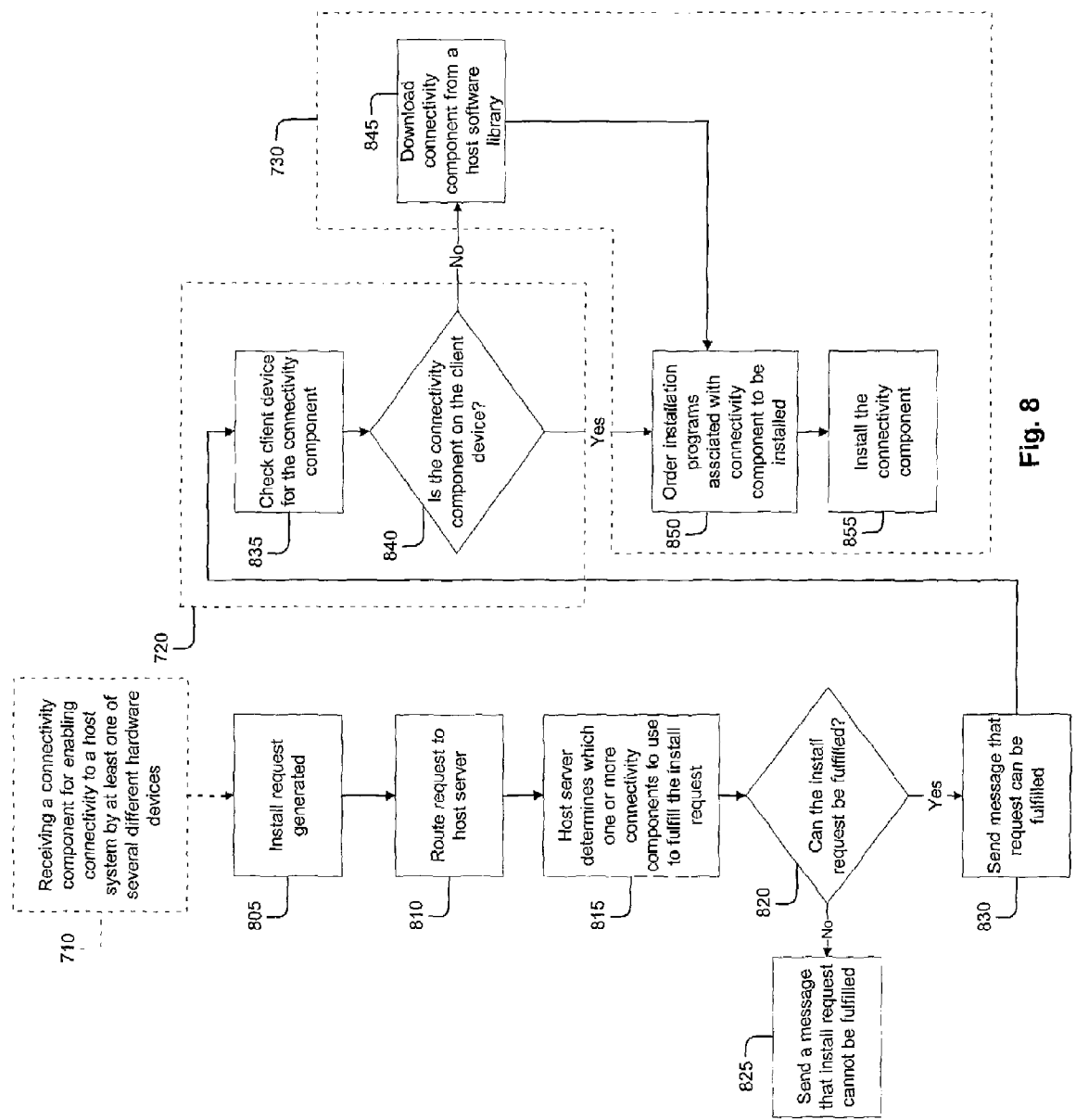
FIG. 8 is an expansion of the flow chart of the FIG. 7.

FIG. 8 shows one implementation of process 700. For example, one or more connectivity components may have been received at a local client device for enabling connectivity to a host system by at least one of several different hardware devices (step 710). Whether or not at least one connectivity component has been received (step 710), process 700 may further include generating an install request (step 805), routing the request to a host server (step 810), using the host server to identify which one or more connectivity components to use to fulfill the install request (step 815), determining whether the install request can be fulfilled (step 820), and sending a message indicating whether the request can or cannot be fulfilled based upon the determination made in step 820 (steps 825 and 830).

The install request may be generated (step 805) in various ways. For example, a user of a client device that currently uses a low-bandwidth communication device and a low-bandwidth connection type to connect to a host system may desire to upgrade the connectivity to using a broadband communication device and a broadband connection type, such as, for instance, by using a cable modem, a satellite modem, or a DSL modem. The install request may be generated by logging on to the host computer and purchasing a broadband connection type that corresponds to a broadband communication device. Additionally or alternatively, the install request may be generated based on user input or it may be generated automatically by the client device upon detection of a hardware component for a new hardware device installed on the client device.

The install request is typically routed to the host server (step 810). The host server may determine which connectivity component to use to fulfill the install request (step 815). For instance, the host server may check a database for a current list of connectivity components required to support a specific install request for a specific hardware device or a specific connectivity type. The host server also may determine which version of the connectivity component may be received. The version may depend on the type of connection desired, the user's operating system, and/or the user's system configuration.

Once the host server determines which connectivity component to use, the host server determines whether the install request can be fulfilled (step 820). The determination (step 820) may include determining whether a particular broadband connectivity type is supported in that specific user's geographical area. The determination (step 820) also may include an investigation of whether the requesting client device can support the requested broadband connectivity. If the install request cannot be fulfilled, the host server may send a message stating that the install request cannot be fulfilled (step 825). By contrast, if the install request can be fulfilled, the host system may send a message that the request can be fulfilled (step 830) and/or may proceed to the next step.

Detecting whether installation of the connectivity component is needed on the client device (step 720 from FIG. 7) may include checking the client device for the connectivity component (step 835) and determining whether the required connectivity component is currently stored on the client device (step 840). Checking the client device for the connectivity component (step 835) may include scanning a storage device, such as a hard drive, on the client device to determine whether the required component is currently copied to the client device. In some instances, the connectivity component is copied to the client device and placed in a dormant state, for example, when a user initially installs a software program such as an ISP client that may be designed to support several different hardware devices and/or configurations. Even if the connectivity component resident on the client device was not activated, it may be available and appropriate for activation from its dormant state. Determining whether an appropriate connectivity component is resident on the client device (step 840) may include checking to see whether the connectivity component is installed and/or determining whether the connectivity component identified on the client device is a sufficiently recent version.

Installing the connectivity component when installation of the connectivity component is needed on the client device (step 730 from FIG. 7) may include downloading the connectivity component from a host software library (step 845), creating a file ordering any installation programs needed to install the identified connectivity component (step 850), and installing the connectivity component (step 855).

For example, if the connectivity component is not installed on the client device and is not resident on the client device in a dormant state, the connectivity component is typically downloaded from the host software library (step 845) and installed on the client device (steps 850 and 855). By contrast, if the connectivity component is resident on the client device in a dormant state, the connectivity component is installed (steps 850 and 855). Activating a dormant connectivity component resident on the client device may include receiving a signal at the client device from the host system to activate and install the connectivity component (steps 850 and 855).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-Rom). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims. For instance, the component installation tool is not limited to receiving, detecting, and installing connectivity components. As described above, the component installation tool may be used to receive, detect, and install, for example, any type of file, module, component, computer program, portion of computer program, and combination of these elements.

What is claimed is:

1. A system for installing computer software components on a client device for enabling connectivity to a host system by at least one of several different hardware devices, comprising:
a selection module that is structured and arranged to select a hardware device from several hardware devices of different physical connectivity types;
a detection module that is structured and arranged to detect whether installation of a particular connectivity component is required to enable connectivity between the client device and the host system using the selected hardware device, wherein the detection module is structured and arranged to determine the required connectivity component by:

generating an installation request to a remote host, receiving a reply to the installation request from the remote host, wherein the reply identifies the required connectivity component if the remote host determines that enabling connectivity between the client device and the host system is feasible using the selected hardware device, and determining whether the connectivity component is stored locally on the client device;

a receiving module that is structured and arranged to receive the connectivity component from a remote host if the connectivity component is not stored locally; and an installation module that is structured and arranged to install the connectivity component on the client device.

2. The system of claim 1 wherein the connectivity component is capable of interfacing with a device driver to enable communications between computer software at the client device and the host system using the new hardware device associated with the device driver.

3. The system of claim 1 wherein the connectivity component is capable of interfacing directly with the new hardware device to enable connectivity between the client device and the host system using the new hardware device.

4. The system of claim 1 wherein the connectivity component includes computer software that interfaces with a driver for the new hardware device that is used to connect to the host system.

5. The system of claim 1 wherein the connectivity component includes a broadband connectivity component to enable connectivity to the host system using a broadband communication device.

6. The system of claim 5 wherein the connectivity component includes a DSL connectivity component to enable connectivity to the host system using a DSL modem.

7. The system of claim 5 wherein the connectivity component includes a cable connectivity component to enable connectivity to the host system using a cable modem.

8. The system of claim 5 wherein the connectivity component includes a satellite connectivity component to enable connectivity to the host system using a satellite modem.

9. The system of claim 1 wherein the installation module installs a list of programs needed to install the connectivity component.

10. The system of claim 9 wherein the list of programs includes a sequential list of programs needed to install the connectivity component such that only one reboot of the client device is necessary to accomplish installation using the sequential list of programs.

11. The system of claim 1 wherein the receiving module, the detection module, and the installation module are structured and arranged to perform automatically without user intervention to receive, detect, and install the connectivity component to enable connectivity to the host system using the new hardware device.

12. The system of claim 1 wherein the connectivity component received includes an updated version of a connectivity component stored on the client device before the connectivity component is installed by the installation module.

13. The system of claim 12 wherein the detection module is structured and arranged to detect whether installation of the connectivity component is needed on the client device by comparing a version of the updated connectivity component received with a version of the connectivity component stored on the client device.

14. The system of claim 1 wherein:

the receiving module is structured and arranged to receive version information from a remote server associated with a connectivity component;

the detection module is structured and arranged to detect whether installation of the connectivity component is needed on the client device, and to determine a version of the connectivity component to install by comparing the version information received from the remote server with version information associated with the connectivity component already received by the receiving module when installation of the connectivity component is needed; and the installation module is structured and arranged to install the connectivity component stored on the client device when the detection module determines the version information associated with the stored connectivity component is correct when compared against the version information received from the remote server.

15. The system of claim 14 wherein:

the receiving module is structured and arranged to receive an updated connectivity component from the remote server when the detection module determines that the version information associated with the connectivity component stored on the client device is not correct when compared against the version information received from the remote server; and the installation module is structured and arranged to install the updated connectivity component received from the remote server.

16. The system of claim 1 wherein:

the receiving module is structured and arranged to include a host system receiving module that is structured and arranged to receive a request to send a connectivity component to a local client device; and the installation module is structured and arranged to include a host system installation module that is structured and arranged to send the connectivity component to the local client device for installation on the local client device in response to the request.

17. The system of claim 16 wherein the detection module is structured and arranged to include a host system detection module that is structured and arranged to determine a version of the connectivity component needed for installation on the local client device.

18. The system of claim 1 wherein the detection module is structured and arranged to detect a prior receipt of the connectivity component that is needed to enable connectivity between the client device and the host system using the new hardware device.

19. The system of claim 1 wherein determining that enabling connectivity between the client device and the host system is feasible using the selected hardware device includes determining whether a physical connectivity type of the selected hardware device is supported in the geographical area of the client device.

20. A method for installing computer software components on a client device for enabling connectivity to a host system by at least one of several different hardware devices, the method comprising:

selecting a hardware device from several hardware devices of different physical connectivity types;

detecting whether installation of a particular connectivity component is required to enable connectivity between the client device and the host system using the selected hardware device, wherein the detection includes determining the required connectivity component by:
generating an installation request to a remote host,
receiving a reply to the installation request from the remote host, wherein the reply identifies the required connectivity component if the remote host determines that enabling connectivity between the client device and the host system is feasible using the selected hardware device, and
determining whether the connectivity component is stored locally on the client device;
receiving the connectivity component from a remote host if the connectivity component is not stored locally; and
installing the connectivity component on the client device.

21. The method as in claim 20 wherein the connectivity component is capable of interfacing with a device driver to enable communications between computer software at the client device and the host system using the new hardware device associated with the device driver.

22. The method as in claim 20 wherein the connectivity component is capable of interfacing directly with the new hardware device to enable connectivity between the client device and the host system using the new hardware device.

23. The method as in claim 20 wherein the connectivity component includes computer software that interfaces with a driver for the new hardware device that is used to connect to the host system.

24. The method as in claim 20 wherein the connectivity component includes a broadband connectivity component to enable connectivity to the host system using a broadband communication device.

25. The method as in claim 20 wherein installing the connectivity component includes installing a list of programs needed to install the connectivity component.

26. The method as in claim 25 wherein the list of programs includes a sequential list of programs needed to install the connectivity component such that only one reboot of the client device is necessary to accomplish installation using the sequential list of programs.

27. The method as in claim 20 wherein receiving the connectivity component, detecting whether installation of the connectivity component is necessary, and installing the connectivity component includes automatically without user intervention receiving, detecting, and installing the connectivity component to enable connectivity to the host system using the new hardware device.

28. The method as in claim 20 wherein the connectivity component received includes an updated version of a connectivity component stored on the client device before the connectivity component is installed by the installation module.

29. The method as in claim 28 wherein detecting whether installation of the connectivity component is needed includes comparing a version of the updated connectivity component received with a version of the connectivity component stored on the client device.

30. The method as in claim 20 wherein:
receiving the connectivity component includes receiving version information from a remote server associated with a connectivity component;
detecting whether installation of the connectivity component is needed includes detecting whether installation of the connectivity component is needed on the client device, and determining a version of the connectivity component to install by comparing the version information received from the remote server with version information associated with the connectivity component already received when installation of the connectivity component is needed; and
installing the connectivity component includes installing the connectivity component stored on the client device when the version information associated with the stored connectivity component is determined to be correct when compared against the version information received from the remote server.

31. The method as in claim 30 wherein:
receiving the connectivity component includes receiving an updated connectivity component from the remote server when the version information associated with the connectivity component stored on the client device is determined not to be correct when compared against the version information received from the remote server; and
installing the connectivity component includes installing the updated connectivity component received from the remote server.

32. The method as in claim 20 wherein:
receiving the connectivity component includes using a host system to receive a request to send a connectivity component to a local client device; and
installing the connectivity component includes using the host system to send the connectivity component to the local client device for installation on the local client device in response to the request.

33. The method as in claim 32 wherein detecting whether installation of the connectivity component is necessary includes using the host system to determine a version of the connectivity component to install on the local client device.

34. The method as in claim 20 wherein detecting whether installation of the connectivity component is necessary includes detecting a prior receipt of the connectivity component that is needed to enable connectivity between the client device and the host system using the new hardware device.

35. The method of claim 20 wherein determining that enabling connectivity between the client device and the host system is feasible using the selected hardware device includes determining whether a physical connectivity type of the selected hardware device is supported in the geographical area of the client device.

36. A computer program for installing computer software components on a client device for enabling connectivity to a host system by at least one of several different hardware devices, the computer program being stored on a tangible computer readable medium and comprising:
a selection code segment that causes the computer to select a hardware device from several hardware devices of different physical connectivity types;
a detection code segment that causes the computer to detect whether installation of a particular connectivity component is required to enable connectivity between the client device and the host system using the selected hardware device, wherein the detection code segment causes the computer to determine the required connectivity component by:
generating an installation request to a remote host,
receiving a reply to the installation request from the remote host, wherein the reply identifies the required connectivity component if the remote host determines that enabling connectivity between the client device and the host system is feasible using the selected hardware device, and
determining whether the connectivity component is stored locally on the client device;

a receiving code segment that causes the computer to receive the connectivity component from a remote host if the connectivity component is not stored locally; and an installation code segment that causes the computer to install the connectivity component.

37. The computer program of claim 36 wherein the connectivity component is capable of interfacing with a device driver to enable communications between computer software at the client device and the host system using the new hardware device associated with the device driver.

38. The computer program of claim 36 wherein the connectivity component is capable of interfacing directly with the new hardware device to enable connectivity between the client device and the host system using the new hardware device.

39. The computer program of claim 36 wherein the connectivity component includes computer software that interfaces with a driver for the new hardware device that is used to connect to the host system.

40. The computer program of claim 36 wherein the connectivity component includes a broadband connectivity component to enable connectivity to the host system using a broadband communication device.

41. The computer program of claim 36 wherein the installation code segment causes the computer to install a list of programs needed to install the connectivity component.

42. The computer program of claim 41 wherein the list of programs includes a sequential list of programs needed to install the connectivity component such that only one reboot of the client device is necessary to accomplish installation using the sequential list of programs.

43. The computer program of claim 36 wherein the receiving code segment, the detection code segment, and the installation code segment cause the computer to perform automatically without user intervention to receive, detect, and install the connectivity component to enable connectivity to the host system using the new hardware device.

44. The computer program of claim 36 wherein the connectivity component received includes an updated version of a connectivity component stored on the client device before the connectivity component is installed by the installation code segment.

45. The computer program of claim 44 wherein the detection code segment causes the computer to detect whether installation of the connectivity component is needed on the client device by comparing a version of the updated connectivity component received with a version of the connectivity component stored on the client device.

46. The computer program of claim 36 wherein:

the receiving code segment causes the computer to receive version information from a remote server associated with a connectivity component;

the detection code segment causes the computer to detect whether installation of the connectivity component is needed on the client device, and to determine a version of the connectivity component to install by comparing the version information received from the remote server with version information associated with the connectivity component already received by the receiving code segment when installation of the connectivity component is needed; and the installation code segment causes the computer to install the connectivity component stored on the client device when the detection code segment determines the version information associated with the stored connectivity component is correct when compared against the version information received from the remote server.

47. The computer program of claim 46 wherein:

the receiving code segment causes the computer to receive an updated connectivity component from the remote server when the detection code segment determines that the version information associated with the connectivity component stored on the client device is not correct when compared against the version information received from the remote server; and the installation code segment causes the computer to install the updated connectivity component received from the remote server.

48. The computer program of claim 36 wherein:

the receiving code segment includes a host system receiving code segment that causes the computer to receive a request to send a connectivity component to a local client device; and the installation code segment includes a host system installation code segment that causes the computer to send the connectivity component to the local client device for installation on the local client device in response to the request.

49. The computer program of claim 48 wherein the host system detection code segment causes the computer to determine a version of the connectivity component to install on the local client device.

50. The computer program of claim 36 wherein the detection code segment causes the computer to detect a prior receipt of the connectivity component that is needed to enable connectivity between the client device and the host system using the new hardware device.

51. The computer program of claim 36 wherein determining that enabling connectivity between the client device and the host system is feasible using the selected hardware device includes determining whether a physical connectivity type of the selected hardware device is supported in the geographical area of the client device.

* * * * *